United States Patent Office 3,355,077
Patented Nov. 28, 1967

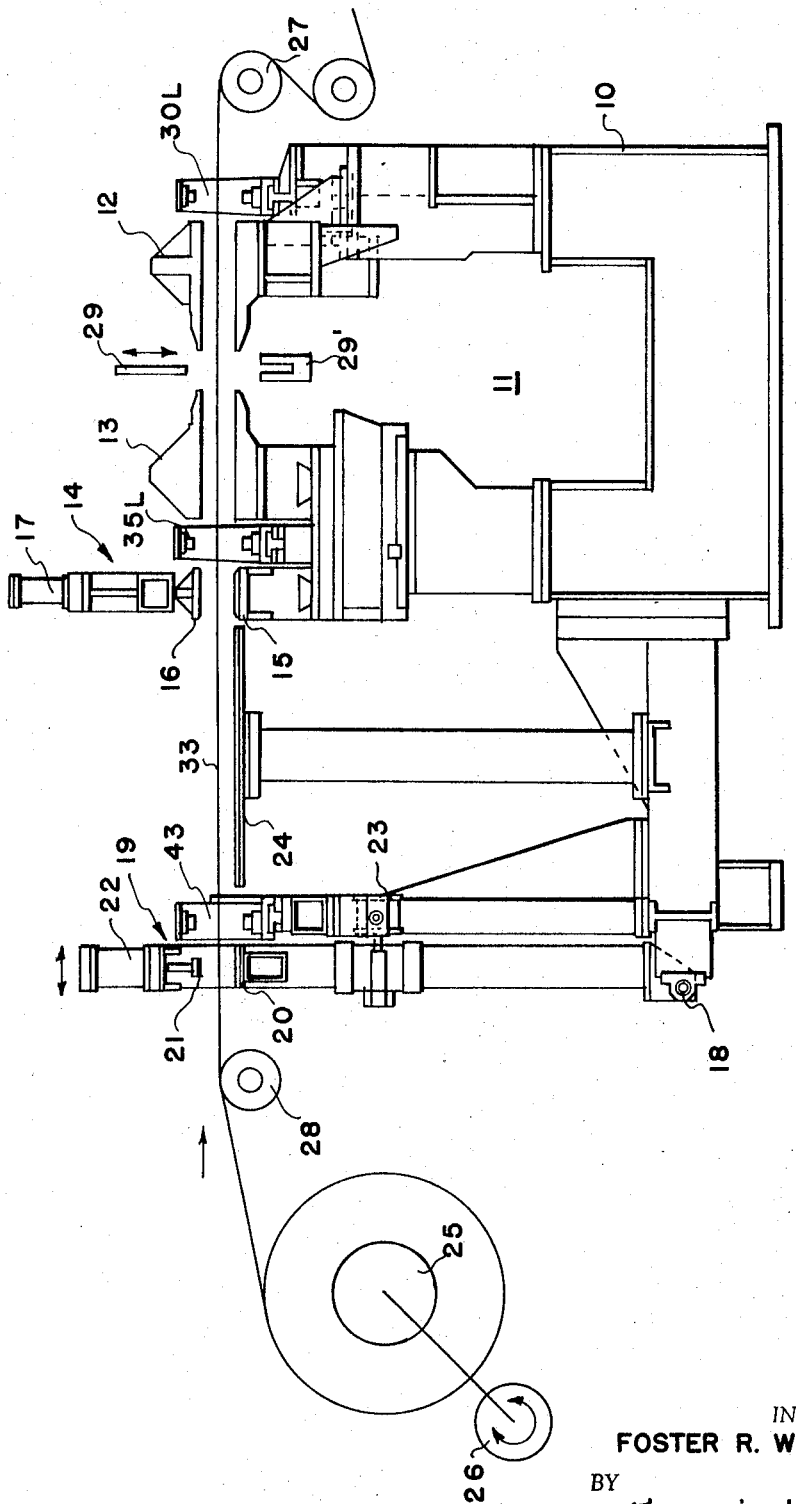

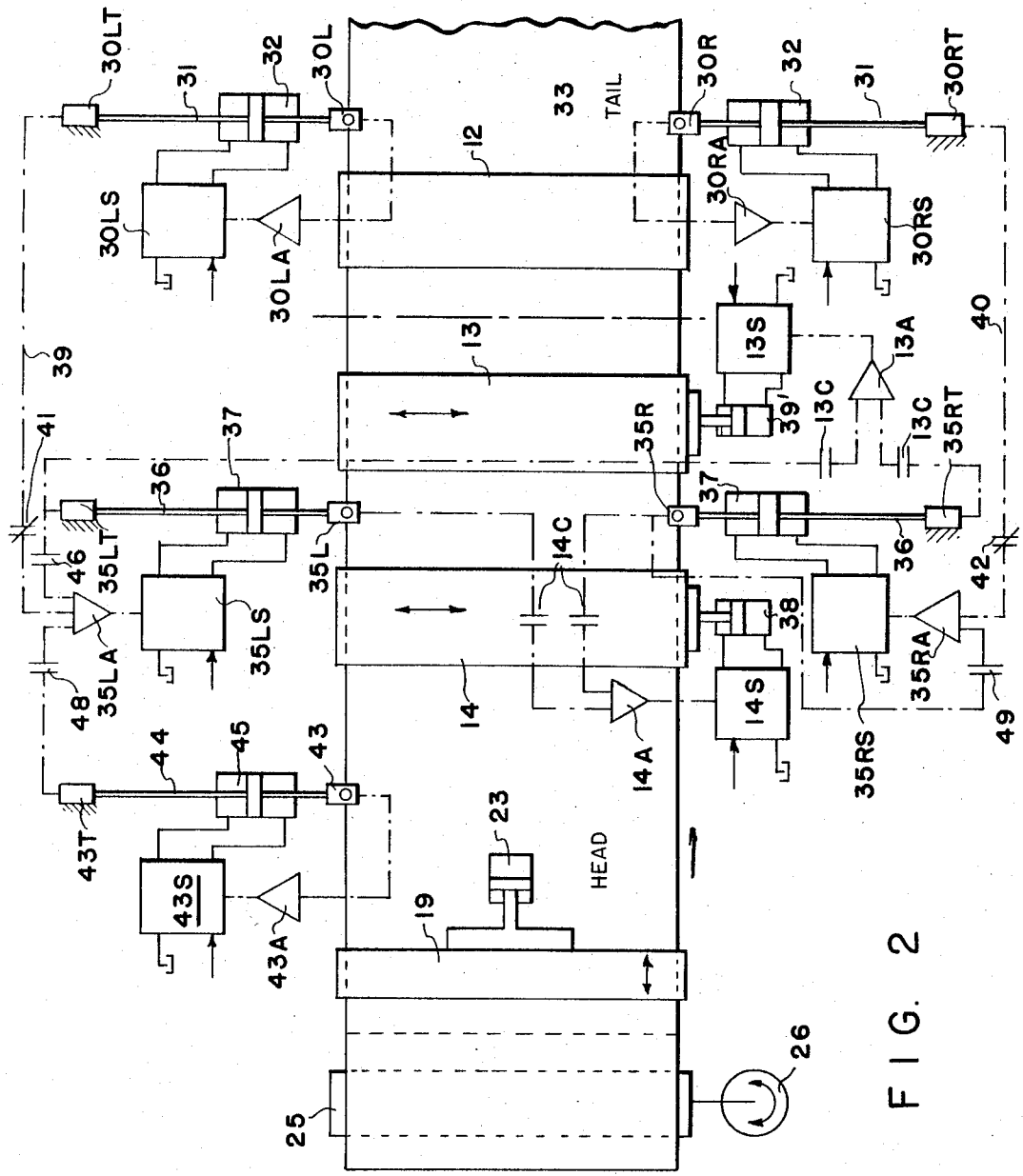

3,355,077
APPARATUS FOR ALIGNING STRIP IN
STRIP JOINING EQUIPMENT
Foster R. Woodward, Warren, Ohio, assignor to The Taylor-Winfield Corporation, Warren, Ohio, a corporation of Ohio
Filed Sept. 15, 1965, Ser. No. 487,557
10 Claims. (Cl. 228—5)

This invention relates to improved apparatus for expeditiously aligning the head end portion of a succeeding strip length to the tail end portion of a preceding strip length preparatory to joining the said strip lengths in general end-to-end relation by a resistance welding operation or otherwise. Such joining devices commonly utilize heavy flat clamps for holding the adjacent end portions of the lengths during the joining operation, and the function of the present method and apparatus is to properly position the centerlines of the strip lengths relative to each other in both longitudinal and lateral aligned relation and also align the centerlines of the strips with the machine centerline before initiating the joining operation. More specifically, the present invention seeks to minimize the equipment and time required to make these alignments, improve the precision thereof, and meticulously avoid any angled joints commonly known as "dog legs." The latter is particularly objectionable since it impedes the proper functioning of continuous strip processing and/or utilization lines and may cause buckling and damage to adjacent convolutions in recoils of the strip.

Since longitudinal camber and waviness is more prevalent in thin strip, the problem of effecting precise longitudinal alignment of successive uncoiled lengths thereof is much greater. The present invention, however, while presenting certain advantages in the alignment of strip generally is of particular utility in aligning thin stock as will become more apparent below.

It is accordingly the primary object of the invention to provide improved apparatus for rapidly effecting longitudinal and transverse alignment in successive strip lengths preparatory to joining the same in general end-to-end relation. A further object of the invention is to embody in such method and apparatus practical means for removing the deleterious effect of camber or waviness which commonly appears in elongated strip of the thinner gauges.

The above objects are accomplished by integrating with the joining apparatus practical and improved facilities for manipulating the strip in response to signals generated by edge position sensors. The latter per se and closely connected implementing devices may be of various kinds, are well known in the art, and form no part of the present invention. Rather, the invention lies in a novel conception of the sequential handling of the strip lengths and the provision of practical apparatus, integrated with the joining equipment, for implementing the involved concepts.

The manner in which the principles of the invention may be employed, in a practical sense, and the specific features and advantages of the invention will become apparent upon consideration of the following specification and the accompanying drawing wherein there is disclosed a preferred embodiment of the invention.

In the drawing:

FIGURE 1 is a side elevation of mechanical apparatus by which the principles of my invention may be carried out;

FIGURE 2 is a plan view, in schematic outline, of the apparatus of FIGURE 1; and FIGS. 3a, 3b, 3c and 3d are schematic showings of the successive steps in the alignment of the tail and head strips.

The apparatus illustrated is designed specifically to make narrow-lap seam welds in consecutive lengths of strip payed off from successive coils of strip, and in which the joined continuous strip is fed to subsequent processing or utilization lines. Such apparatus is well known in the art and per se forms no part of the present invention, but for the purpose of implementing the present invention one of the main strip clamps thereof must be mounted for transverse movement with respect to the longitudinal line of the strip and must have controlled power means for so transversely moving the clamp, as will appear later. Reference numeral 10 designates the main base of the joining apparatus having a large window 11 in which is mounted at least part of a shear and elements of a seam welder or other instrumentality used to join this strip end-to-end.

The joining equipment has an exit strip clamp 12 and an entry strip clamp 13, the latter being mounted for transverse sliding movement as briefly pointed out above. These clamps 12 and 13 are commonly fluid-operated under suitable control by pull-down cylinders not specifically shown herein. In accordance with the principles of the present invention, I provide ahead of the entry clamp 13 an auxiliary clamp 14 having a bottom platen 15 and a top platen 16 actuated by a cylinder 17. As in the case of the entry clamp 13, the top and bottom platens of the clamp 14 as well as the actuating cylinder 17 constitutes a unitary assembly which is slideable on the base 10 transversely of the longitudinal axis of the strip.

Spaced considerably ahead of the auxiliary clamp 14 and pivoted transversely on the base 10 or a rigid adjunct thereto, as at 18, is a clamp 19 having a lower platen 20 and an upper platen 21 actuated by a fluid cylinder 22. The clamp 19 is arranged to be tilted away from and toward the clamp 14 by a double-acting fluid cylinder 23. Interposed between the clamps 14 and 19 is a table 24 to facilitate the threading of new strip into the apparatus.

Strip is fed into and through the apparatus above outlined by means of an uncoiler 25 which is commonly provided with means 26 for rotating the uncoiler in opposite directions and for braking the rotation thereof. For purposes of this invention, the uncoiler drive must at least be sufficiently comprehensive to slowly rotate the uncoiler in a forward feeding direction. At the exit end of the apparatus there is commonly provided strip pulling rolls 27, and normally the control for the pulling rolls is coordinated with the control for the uncoiler in the master control circuit for the line of equipment in which the apparatus herein involved is located. I additionally provide an elevated idler roll 28 which with one of the rolls 27 establishes a plane of movement of the strip through the apparatus involved herein. When all the clamps 12–14 and 19 are open, the strip may flow unimpeded from the uncoiler 25 through the involved apparatus and thence to subsequent processing and/or utilization equipment.

Completing the physical apparatus of the joining equipment is a shear having blades 29 and joining equipment, not shown, which may be of the electric resistance seam welding type having upper and lower wheel electrodes. It is well known in the art to mount the shear and the welder in side-by-side relation on a frame which slides transversely of the line of strip in the opening 11 of the base 10 so that with the strip lengths to be joined securely held in the clamps 12 and 13 the abutting lengths of the lengths may be trimmed, and the ends thereafter overlapped and traversed by the welding wheels. It is also known in the prior art to provide for the tilting and longitudinal movement of one of the clamps 12, 13, to effect the overlap of the sheared ends of the strip lengths with precision prior to welding.

Closely adjacent to the exit end of the exit clamp 12, I provide strip edge sensors 30L and 30R which may be of the known photoelectric type generating a maximum voltage when clearing the strip, no voltage when entirely over the strip, and a controlling value of voltage when centered over the edge of the strip. These sensors are carried by transversely movable rods 31, each actuated by a double-acting fluid cylinder 32 and, in turn, actuating transducers 30LT and 30RT, respectively. The function of the sensors 30L and 30R is to follow precisely the edges of the strip (indicated by reference numeral 33) and to thereby cause transducers 30LT and 30RT to generate voltage signals commensurate with the instantaneous positions of the side edges of the strip. For this purpose, the signal outputs of sensors 30L and 30R are amplified at 30LA and 30RA, respectively, and impressed on electrohydraulic servo controls 30LS and 30RS, respectively, which actuate the cylinders 32. Such follow and control and signal generating assemblies are well known in the art, per se form no part of the present invention, and are included herein only for explanatory or exemplary purpose. Obviously, specific equipment other than that schematically illustrated and briefly explained above may be utilized for the purpose of the present invention as will become more apparent below.

A second set of strip edge positioning sensors 35L and 35R and carried by transversely slideable rods 36 are positioned intermediate the strip clamps 13 and 14, being arranged to be moved inwardly and outwardly by the double-acting cylinders 37. The cylinder 37 for sensor 35L is actuated and controlled by an electrohydraulic servo mechanism 35LS under the control of the output of an amplifier 35LA. Similarly, the cylinder 37 for sensor 35R is actuated by the electrohydraulic servo mechanism 35RS under the control of the output of an amplifier 35RA. As will appear more fully in the below described sequence of operation, this invention requires that the tail end portion of a length of strip which is almost completely payed off be aligned longitudinally with the longitudinal axis of the pass line through the equipment, and to accomplish this the following additional control instrumentalities are provided:

First, the auxiliary clamp 14 is made transversely movable of the longitudinal center line of the equipment, being actuated by a double-acting cylinder 38 controlled by an electrohydraulic servo mechanism 14S which, in turn, receives directive signal voltage from a balanced amplifier 14A. Secondly, by means of conductors 39 and 40 and relay contacts 41 and 42 in these respective conductors, the servo mechanisms 35LS and 35RS control from amplifiers 35LA and 35RA to cause the sensors 35L and 35R, respectively, to follow precisely in longitudinal alignment with the forward sensors 30L and 30R. Third, the outputs of sensors 35L and 35R are impressed on the balancing amplifier 14A through relay contacts 14C which are closed at an appropriate time during the sequence as will appear below. The control amplifier 14A is such as to supply a directional signal output which, at an appropriate time in the sequence and upon closing of the contacts 14C, will direct actuation of the cylinder 38 to move the strip into precise edge alignment with the pre-positioned edge sensors 35L and 35R. In this manner the tail end portion of a strip length which is almost payed off will be precisely angularly aligned longitudinally with the centerline of the equipment.

For a purpose to be better understood below, the main strip clamp 13 is also made transversely movable, being actuated by a double-acting cylinder 39' under the control of an electrohydraulic servo mechanism 13S deriving directional signal voltage from a balancing amplifier 13A. The movable carriers 36 for the sensors 35L and 35R operate transducers 35LT and 35RT, respectively, and at an appropriate time the outputs of these transducers are impressed on the control amplifier 13A through relay contacts 13C.

At this point it should be remembered that the primary function of the invention is to align, both angularly and transversely, the adjacent end portions of extended lengths of strip which are to be joined together in general end-to-end relation. It should also be understood that these lengths may be of different widths which raises a complication solved by the method and apparatus of the present invention. Since the joining is done between the main clamps 12 and 13, it is imperative that the tail end of the stopped strip length be precisely located in the exit clamp 12 before this clamp is closed, the trim cut made and the joint made. This is accomplished as follows: With all the clamps open and the leading strip length almost payed off the reel 25, the strip is stopped but the sensor 35L will be longitudinally aligned with the sensor 30L with respect to the longitudinal centerline of the equipment regardless of the skewed angularity of the strip in the equipment, although the forward sensors 30L and 30R will be precisely on the strip edges. At this time the strip tension on the reel 25 will be relieved by a slight forward actuation of the power means 26 under manual or automatic control, not shown, and thereafter the auxiliary clamp 14 is closed. Now the contacts 14C are closed under manual or automatic control, not shown, and the balancing amplifier 14A will operate to move the clamp 14 in the direction required to center the strip between the pre-positioned sensors 35L and 35R. That portion of the strip length forwardly of the auxiliary clamp 14 can, of course, swing slightly about the upper pull-out roll 27, and the previously provided slack in the strip between this clamp 14 and the reel 25 will likewise permit the required slight sideways shifting of the strip. While such shifting may cause deviation from centering at the sensors 30L, 30R the parallel longitudinally aligned follow action of these sensors with the sensors 35L, 35R insures that the alignment correction effected by clamp 14 can proceed to the precise longitudinal alignment of the side edges of the strip with the longitudinal axis or axes of the equipment. Thereafter, the exit clamp 12 is closed with the strip length in final position, the shear actuated, the clamp 14 opened, and the reel 25 reversed to draw the scrap end of strip out of the aligning and joining equipment.

It should be obvious that the various transducers 30LT, 35LT and 43T, each has within it a normally stationary element which is fixed with respect to the physical centerline of the equipment. Therefore, the action of the auxiliary clamp 14 is to center the tail end portion of the first strip length as well as to angularly align this portion of the strip so that its centerline coincides with the equipment centerline. The latter is made possible because in actual practice the pull-out rolls 27 are a substantial distance from sensors 30 and 35 and further because the design of these rolls and subsequent strip handling devices in the complete equipment line serve to center the running strip.

The shear 29 is preferably of the double type in which the upper blade (or two spaced blades if used) make two longitudinally spaced cuts separated by the distance represented schematically at 29' in FIGURE 1. The longitudinal width of this space is sufficient to enable the ragged forward edge of a new strip length to be cropped off after said edge has been advanced into the equipment into abutting relation with the previously sheared tail end of the first or preceding strip length. As will appear later, this cropping of the new strip takes place only after the new strip has been centered and aligned and while the same is rigidly clamped by the main entry clamp 13. The purpose of this is to retain precise parallelism and spacing of the sheared head end of the new strip and the sheared tail end of the preceding strip immediately prior to the above mentioned manipulation of one of the clamps 12, 13, to provide the precise overlap commonly desired for mesh seam welding.

After the scrap tail end portion of the preceding coil of strip has been withdrawn from the equipment, as explained above, a new coil of strip is now mounted on the uncoiler 25 and its head end threaded into near the equipment into abutting contact with the sheared tail end of the preceding strip length. Alternatively, the new coil of strip may be mounted on a separate uncoiler, it being common and well known in the art to use two uncoilers for feeding strip joining equipment and wherein while one uncoiler is paying off strip the other one may be loaded for the prompt supplying of new strip upon the exhaustion of the strip from the first uncoiler. In either arrangement it is desirable to quickly align the centerline of the leading end portion of the new strip with respect to the centerline of the tail end portion of the preceding strip, and this is accomplished by this invention in the following manner:

A further edge position sensor 43 is located intermediate the auxiliary clamp 14 and the uncoiler 25. Again, the sensor 43 is carried by a transversely movable support 44 actuated by double-acting cylinder 45 under the direct control of a servo mechanism 43S receiving directive voltage signals from an amplifier 43A. The latter is in turn controlled from the output of sensor 43, and the instantaneous position of the carrier 44 is detected and reproduced electrically by the transducer 43T as previously explained. Thus, the sensor 43 follows positionally the edge of the strip passing through it.

Normally open contacts 46 of a relay in an appropriate sequence circuit (not shown herein) may interconnect the output of transducer 35LT with the balancing amplifier 35LA. Also, for a purpose to become obvious below, sequence controlled contacts 48 may connect the output of transducer 43T with the balancing amplifier 35LA, and sequence controlled contacts 49 will connect the output of sensor 35R with the balancing amplifier 35RA.

After the leading end portion of the new strip is threaded into near the equipment into abutting relation with the sheared tail end of the preceding strip, the auxiliary clamp 14 and the pivoted clamp 19 are closed, and at the same time the switches 41 and 42 are opened while switches 46, 48 and 49 are closed. Immediately thereafter the cylinder 23 is actuated to stretch the strip which lies between clamps 14 and 19, and back tension at the coil holder 25 is removed by slight forward jogging of the power means 26. These various actuations are accomplished either manually or by automatic sequence program control, or a combination of both, depending on the degree of automation desired.

The outputs of the transducers 43T and 35LT are balanced at the amplifier 35LA to insure that the sensors 43 and 35L always keep in longitudinal alignment and are therefore both equidistant from the equipment centerline. The output of sensor 35R connected through switch 49 causes the sensor 35R to precisely follow the edge of the new strip. Sensor 43 follows the back edge of the strip. If there is any angular misalignment of the strip, the imbalance as detected at amplifier 14A (contacts 14C being closed at this time) will actuate cylinder 38 in one direction or the other to cause the clamp 14 to be cross-traversed to bring the back edge of the strip to the view of sensor 35L. During the operation the entry strip pivots between the faces of clamp 19, said clamp allowing no lateral movement of the strip, at this point.

Thereafter, in the sequence of operations, the entry main clamp 13 is closed and the signal values generated by the transducers 35LT and 35RT are impressed on the balancing amplifier 13A by the switches 13C, which are now closed. After the clamp 13 is closed but slightly before the closing of switches 13C, the clamps 14 and 19 are opened.

Clamp 12 has been previously closed on the preceding strip. Sensors 30L and 30R engage on rear and front edges of preceding strip in order to signal deviation of centerline of preceding strip from centerline of the equipment line.

Likewise, sensors 35L and 35R engage on rear and front edge of the new strip in order to signal deviation of centerline of strip head end from the centerline of the equipment centerline.

The above two signals are compared to control the fluid flow to cylinder 39 causing cross-traverse of clamp 13. The clamp 13 is sufficiently powerful to retain the previously established angular alignment of the new strip even though the leading end portion thereof is moved sideways by the clamp 13 caused by the action of the balancing amplifier 13A actuating servo-cylinder 39' through the servo-valve 13S. As clamp 13 moves, sensors 35L and 35R follow strip edges, changing position of the new strip centerline until it coincides with the centerline of the preceding strip, regardless of differences in the width of the preceding and new strips.

Practically all of the directional and side positional deviation result from imperfections in the mounting or built-up structure of the paying off coil of strip, and all of these deviations are effectively handled by the present invention. Since the fixed elements of transducers 35LT and 35RT are also positionally related to the physical centerline of the equipment, the matching or balancing amplifier 14A is operative to so manipulate the closed auxiliary clamp 14 that the centerline of the longitudinally aligned new strip is matched with the centerline of the preceding strip regardless of differences in the width of the new and preceding strip lengths.

It should now be apparent that I have provided an improved apparatus for aligning strip in strip joining equipment which accomplishes the objects initially set out. The strip lengths to be joined are rapidly aligned both as to longitudinal direction and lateral relation with matched centerlines so that no "dog legging" is possible and whereby automatic compensation is made for variation in strip width. The deleterious effect of waviness and/or camber as has been accepted in the prior art is minimized by my invention through the use of the stretch clamp 19 and other aspects. The latter evolves from the fact that the control of the slow down and stoppage of the complete line is normally such that at complete stoppage the expanse of strip between the uncoiler 25 and the pull-out rolls 27 is under tension or that by momentary application of reverse power to the drive 26 such tension may be effected.

Since many changes may be made in the physical apparatus of my invention without departing from the spirit or scope thereof, reference should be had to the appended claims in determining the true scope of the invention. For example, other types of edge positioned sensors, data translators, and clamp actuators (transverse) may be readily substituted to accomplish the purpose and results of the invention. Also, since the clamps 13, 14, are only alternately closed they may be mounted on a single slide actuated by a single reversible motive means, but in such case more switching would probably be required in the control circuit for such means.

I claim:

1. In combination with apparatus for joining strip in general end-to-end relation and having an entry clamp and an exit clamp for holding strip lengths to be joined during the joining cycle and said entry clamp being so mounted and having means whereby it may be moved transversely of the longitudinal line of strip with respect to the exit clamp, a third strip clamp adjacent the entry end of said entry clamp and being also so mounted and having means whereby it may be moved transversely of said longitudinal line with respect to said exit clamp, strip edge position sensors at the entry end of said entry clamp and at the exit end of said exit clamp to generate signals determinative of the longitudinal alignment of a strip length passing through all of said clamps, and means responsive to the signals generated by said sensors to actuate said means to move said third clamp whereby upon closing of said third clamp and with said entry and exit clamps opened the head portion of the succeeding strip length may be moved transversely so that its centerline is aligned longitudinally with respect to the centerlines of said exit and entry clamps.

2. Apparatus according to claim 1 further including a shear positioned between said entry clamp and said exit clamp whereby upon closure of the clamps a strip length held thereby may be severed after which the head end of the succeeding length may be retained in said longitudinally aligned relation in said exit clamp, and means for withdrawing backwardly the tail end of the succeeding length from the apparatus upon opening of the entry clamp.

3. Apparatus according to claim 1 further including a fourth strip clamp and control means therefor including strip edge sensing means to laterally move the fourth strip clamp to laterally align the trailing end portion with the leading end portion of a succeeding strip length.

4. Apparatus according to claim 3 further including means to longitudinally stretch the portion of the succeeding strip length being longitudinally aligned to thereby minimize alignment errors which may result from waviness in said strip portion.

5. In combination with apparatus for joining successive strip lengths in general end-to-end relation and having longitudinally spaced entry and exit strip clamps as well as a shear positioned between said clamps to trim the ends of the strip lengths to be joined preparatory to the joining operation and while said strip lengths are secured in said clamps, a laterally slideable auxiliary strip clamp adjacent the entry portion of said entry clamp, a pair of longitudinally spaced strip edge position sensors for controlling the lateral sliding of said auxiliary clamp whereby a strip length stretched through said apparatus may be aligned longitudinally and thereafter secured by said exit clamp and then severed by said shear, and a third strip edge position sensor positioned longitudinally preceding one of said first pair of sensors and operative therewith to control the lateral movement of said auxiliary clamp while the leading end portion of a successive strip length is secured by said auxiliary clamp and has its head end projecting into said shear to longitudinally align succeeding edge portions of said leading end portion preparatory to the second actuation of said shear.

6. Apparatus according to claim 5 further including a fourth strip clamp preceding said auxiliary clamp, and means to move said fourth strip clamp away from said auxiliary clamp to longitudinally stretch the said leading end portion of said succeeding strip length while the same is being longitudinally aligned by said fourth clamp under control of the said third sensor and the said one of said first mentioned pair of sensors.

7. Apparatus according to claim 5 further including means to move said entry clamp laterally of the longitudinal axis of the apparatus, the arrangement being such that after longitudinal alignment of the said leading end portion of strip said entry clamp may grasp said strip and move the same laterally into centerline matching with the preceding strip length grasped by said exit clamp.

8. Apparatus according to claim 7 further including a fourth strip edge position sensor for tracking the opposite edge of the strip from that tracked by the said one of said pair of sensors, the said fourth sensor and the said one of said pair of sensors having associated carriers which move laterally in response to the variations in the position of the respective opposite edges of strip with respect to the longitudinal centerline of the apparatus, means to generate signals in response to the positions of said carriers, and means to compare said signals and to operate said entry clamp moving means in response to an imbalance thereof.

9. In combination with apparatus for joining successive strip lengths having longitudinally spaced strip entry and exit clamps and means movable between said clamps to shear and join the strip lengths, means to longitudinally align and center a first strip length lying in and extending through said apparatus with respect to the longitudinal centerline of the apparatus after which said clamps may be closed preparatory to actuation of the shear and the continuance of the securement of the strip by said exit clamp, means to longitudinally align the leading end portion with respect to the longitudinal centerline of the apparatus of a succeeding strip length with the leading end thereof in the shear after which said entry clamp may be closed and the shear actuated a second time, and means to move said entry clamp laterally to center match the succeeding strip with the first strip.

10. Apparatus according to claim 9 further including means to stretch longitudinally the said leading end portion of said succeeding strip while the same is being longitudinally aligned in the apparatus.

References Cited

UNITED STATES PATENTS

| | | | |
|---|---|---|---|
| 2,827,809 | 3/1958 | Beam | 228—4 |
| 3,021,416 | 2/1962 | Mallett et al. | 219—82 |
| 3,057,056 | 10/1962 | Foley et al. | 228—13 |
| 3,191,843 | 6/1965 | Tompkins | 228—5 |
| 3,198,413 | 8/1965 | Cooper | 228—4 |
| 3,198,931 | 8/1965 | Klempay | 228—5 |
| 3,247,354 | 4/1966 | Mallett et al. | 219—82 |
| 3,256,419 | 6/1966 | Taylor et al. | 219—83 |

RICHARD H. EANES, JR., *Primary Examiner.*